Patented Aug. 14, 1951

2,564,366

UNITED STATES PATENT OFFICE 2,564,366

EMBALMING PREPARATIONS

Argo E. Landau and Frank X. Grossi, St. Louis, Mo., assignors to Royal Bond, Inc., St. Louis, Mo., a corporation of Missouri No Drawing. Application October 12, 1946, Serial No. 702,877

6 Claims. (Cl. 27—22)

This invention relates in general to certain new and useful improvements in embalming preparations.

Up to the time of the present invention, it has been standard practice on the part of morticians and embalmers to purchase embalming fluids, that is to say, liquids containing various preservative agents, and even though some manufacturers of embalming fluids supply the fluid in concentrated form for dilution by the embalmer, nevertheless, liquids of this type contain large percentages of water and are, therefore, bulky, expensive, and troublesome to ship and store.

It is hence the primary object of the present invention to provide a "dehydrated embalming fluid," that is to say, an embalming praparation in powdered or solid form capable of being diluted with a proper quantity of water to form an embalming fluid at the time of actual use.

It is a further object of the present invention to provide a solid embalming preparation which is compact and economical to store and ship, and which is completely stable over long periods of time when stored in the dry state.

It is a further object of the present invention to provide a solid embalming preparation which may be stored in the dry state and may be added in small quantities to appropriate amounts of water to make a desired amount of embalming fluid, when, as, and if needed, thus avoiding the loss of expensive embalming fluids due to storage of large quantities prior to the time of actual use.

It is an additional object of the present invention to provide an embalming fluid of the type stated which does not, either in the dry state or when diluted for actual use, give off noxious fumes such as the fumes given off by formalin and other formaldehyde containing solutions.

And with the above and other objects in view, our invention resides in the novel processes and compositions of matter presently described and pointed out in the claims.

Broadly speaking, the present invention resides in the discovery of water-soluble solid compounds capable of producing a preservative effect equal to or better than formaldehyde. Such products may be referred to as nitro paraffin-formaldehyde condensation products, such as, for example, trimethylolnitromethane, dimethylolnitropropane, methylolnitroethane, 2-nitro 2-methyl 1-propanol, and 2-nitro 2 ethyl 1,3 propanediol. Compounds of this type will, in the presence of the proper catalyst, i. e., an alkali metal carbonate, give off formaldehyde at a slow uniform rate when injected into the tissue of a corpse or cadaver being embalmed. It will thus be evident that embalming fluids which are formulated with these ingredients are entirely pleasant to use since they do not give off noxious odors during the embalming procedure, but nevertheless generate substantial and entirely effective quantities of formaldehyde, in situ, thus producing an unusually satisfactory preservative action upon the tissue of the corpse or cadaver being embalmed. Furthermore, these nitro paraffin-formaldehyde condensation products, existing normally in the solid state and being water-soluble, can be readily compounded to provide powdered embalming preparations which can be used by the embalmer to make embalming fluids, when, as and if needed, by the simple addition of such preparations in measured quantity to a measured quantity of water. By way of illustration, and not by way of limitation, the following are examples of embalming preparations formulated in accordance with the present invention.

Example I

| | Gr. |
|---|---|
| Trimethylolnitromethane | 200 |
| $K_2CO_3$ | 5 |
| Wetting agent a phosphorated higher alcohol e. g. (capryl) $_5Na_5P_6O_{20}$ | 5 |
| Sulfanilimide | 1 |
| Eosin dye and perfume, quantity to suit | |

(The above powdered mixture can be added to a sufficient quantity of water to make one pint of full strength embalming fluid.)

Example II

| | Gr. |
|---|---|
| Methylolnitroethane | 250 |
| $K_2CO_3$ | 5 |
| Wetting agent a phosphorated higher alcohol e. g. (capryl) $_5Na_5P_6O_{20}$ | 5 |
| Sulfanilimide | 1 |
| Eosin dye and perfume, quantity to suit | |

(The above powdered mixture can be added to a sufficient quantity of water to make one pint of full strength embalming fluid.)

It should be understood that changes in the methods, compositions, percentages, and combinations above set forth may be made without departing from the nature and principle of our invention.

Having thus described our invention, what we claim and desire to secure by Letters Patent is:

1. A dry embalming preparation containing trimethylolnitromethane, potassium carbonate, sulfanilimide, and a wetting agent.

2. A dry embalming preparation having the following formulation:

| | Gr. |
|---|---|
| Trimethylolnitromethane | 200 |
| $K_2CO_3$ | 5 |
| Wetting agent (a phosphorated higher alcohol) | 5 |
| Sulfanilimide | 1 |
| Eosin dye and perfume, quantity to suit. | |

3. A dry embalming preparation having the following formulation:

| | Gr. |
|---|---|
| Methylolnitroethane | 250 |
| $K_2CO_3$ | 5 |
| Wetting agent (a phosphorated higher alcohol) | 5 |
| Sulfanilimide | 1 |
| Eosin dye and perfume, quantity to suit. | |

4. A dry embalming preparation containing approximately—

| | Gr. |
|---|---|
| Methylolnitroethane | 250 |
| $K_2CO_3$ | 5 |
| (Capryl)$_5$Na$_5$P$_6$O$_{20}$ | 5 |
| Eosin dye and perfume, quantity to suit. | |

5. A dry powder-like embalming preparation containing potassium carbonate, a wetting agent, and a nitro paraffin formaldehyde condensation product.

6. A dry powder-like embalming preparation containing potassium carbonate, (capryl)-$_5$Na$_5$P$_6$O$_{20}$, and a nitro paraffin formaldehyde condensation product.

ARGO E. LANDAU.
FRANK X. GROSSI.

REFERENCES CITED

The following references are of record in the file of this patent:

UNITED STATES PATENTS

| Number | Name | Date |
|---|---|---|
| 81,755 | Crane | Sept. 1, 1868 |
| 2,152,484 | Jones | Mar. 28, 1939 |
| 2,233,428 | O'Brien | Mar. 4, 1941 |
| 2,318,319 | McDonald | May 4, 1943 |
| 2,426,128 | Trowell | Aug. 19, 1947 |

OTHER REFERENCES

"Embalming Fluids," by Simon Mendelsohn, published by Chemical Publishing Co., Inc., New York, N. Y., 1940, page 53, Copy available in Division 20.